(No Model.)

F. D. PIERCE.
ROAD ENGINE.

No. 274,024. Patented Mar. 13, 1883.

G. W. Gibbs
Geo. Karbach
} Witnesses

Franklin D. Pierce, Inventor.

UNITED STATES PATENT OFFICE.

FRANKLIN D. PIERCE, OF BUFFALO, NEW YORK.

ROAD-ENGINE.

SPECIFICATION forming part of Letters Patent No. 274,024, dated March 13, 1883.

Application filed November 24, 1882. (No model.)

*To all whom it may concern:*

Be it known that I, FRANKLIN D. PIERCE, of the United States, residing at Buffalo, in the county of Erie and State of New York, have invented certain new and useful Improvements in Road-Locomotives or Traction-Engines, of which the following is a specification.

My invention relates to improvements in locomotives or traction-engines for running on common roads or on rails to draw plows or for other purposes, and which may, with slight changes, be employed as a fixed motor to drive agricultural or other machinery.

With some modifications in construction and in the arrangement of the driving mechanism the machine may also be used for transporting passengers and freight.

The nature of the invention consists mainly in the construction and arrangement of the driving mechanism, whereby the inner wheel may be thrown out of gear in rounding a curve, and in the combination of said driving mechanism with the supporting-frame, rear springs, rear axle, and the guides for said axle, whereby the said axle is permitted to move in a vertical direction either toward or from the said supporting-frame as far as the said springs will permit it without interfering with the transmission of power to the drive-wheels.

It further consists in the construction and arrangement of the steering mechanism.

Figure 1:
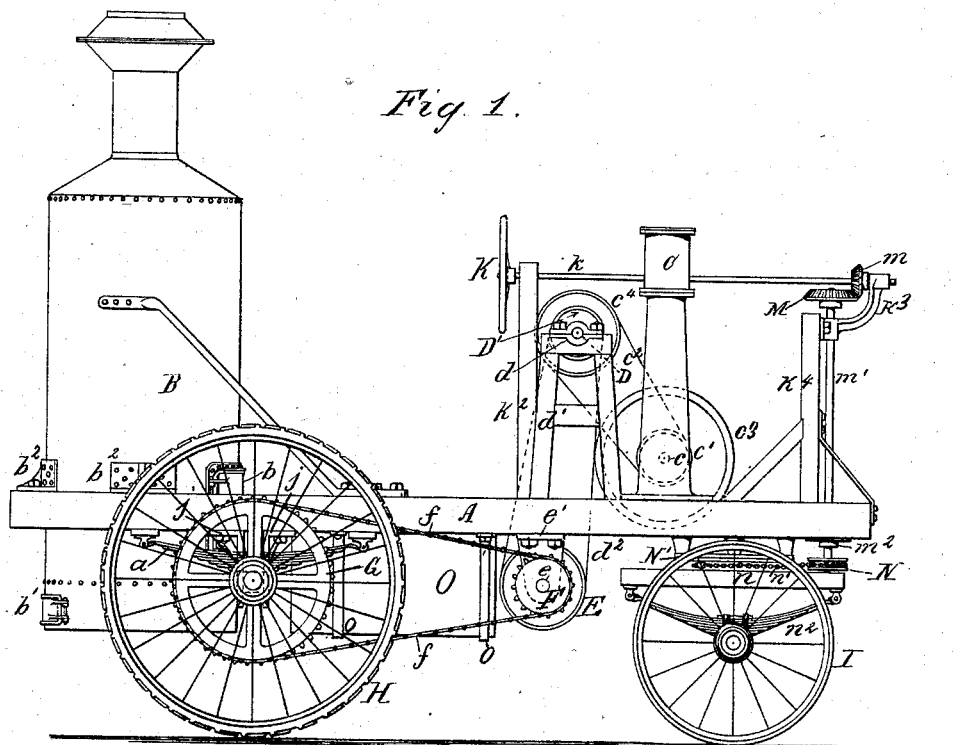
Figure 2:
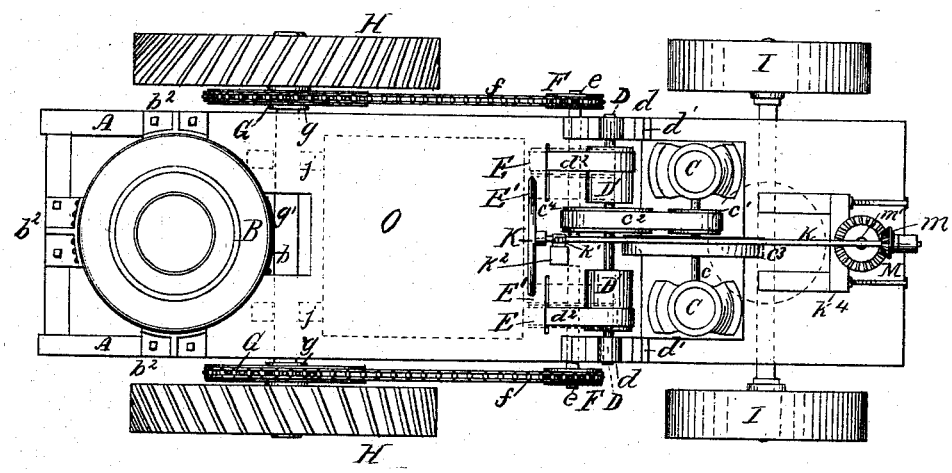

In the drawings, Figure 1 is a side elevation of my improved road-locomotive or traction-engine, and Fig. 2 is a top plan view of the same.

Similar letters refer to similar parts throughout the views.

The supporting-frame A rests near its rear end on springs $a$, which are secured to the axle $g'$ in the usual manner.

The boiler B is secured to the frame A by means of brackets $b^2$. It is provided with a door to the fire-box $b$ and a door to the ash-pit $b'$.

The engine C C, a double-cylinder vertical in this case, is provided with a balance-wheel, $c^3$, placed on the crank-shaft $c$. The ends of said crank-shaft may project beyond its outside bearings far enough to permit a band-wheel to be placed on either end when the machine is desired to be employed as a fixed motor. When in operation as a road-locomotive, power is transmitted by a belt or chain, $c^2$, from a pulley or sprocket-wheel, $c'$, placed on the crank-shaft $c$, to a pulley or sprocket-wheel, $c^4$, placed on a horizontal shaft, D, running in bearings $d\ d$, which rest upon and are secured to the frame $d'$. On the shaft D are placed pulleys D' D', from which the power is transmitted by the belts $d^2\ d^2$ to the pulleys E E, which are placed on the shafts $e\ e$, and secured rigidly thereto. E' E' are pulleys placed loosely on the shafts $e\ e$. On the ends of the shafts $e\ e$, whose outer bearings are formed by the bracket-hangers $e'$, secured to the frame A, are placed sprocket-wheels F F, from which power is transmitted by the chains $f\!f$ to sprocket-wheels G G, placed on the hubs $g\ g$ of the drive-wheels H H, and secured rigidly thereto. The drive-wheels H H are placed loosely on the axle $g'$. The axle $g'$ is prevented from moving in any other than a vertical direction by the guides $j\ j$, which are secured to the frame A. Shifting-levers may be provided, whereby the belt $d^2$ on either side may be moved over from the tight pulley E to the loose pulley E', and the corresponding drive-wheel H thrown out of gear. The pulleys E E and E' E', and the belts $d^2\ d^2$, may be incased below the frame A to protect them from dust and dirt.

K is a hand-wheel placed on a shaft, $k$, which, at one end, works in a bearing, $k'$, secured to an upright post, $k^2$, and at the other in a bracket-bearing, $k^3$, which is secured to a frame, $k^4$. On the shaft $k$, near its anterior end, and secured rigidly thereto, is a small bevel-wheel, $m$, which is geared with a larger bevel-wheel, M, placed on the upper end of the vertical shaft $m'$, which, at one end, works in the bracket-bearing $k^3$, previously referred to, and at the other in a bearing, $m^2$, which is secured to the frame A. On the lower end of the vertical shaft $m'$ is placed a chain-wheel, N, which is connected with and operates the fifth-wheel N' by the chain $n'$ in the ordinary well-known manner. The fifth-wheel is secured to the frame $n$, which rests upon the springs $n^2$, which in turn rest upon the axle of the supporting and steering wheels I I, all being of ordinary and well-known construction.

O is the water-tank, which may be constructed of any suitable material, and suspended from the frame A by the supports $o\ o$.

I prefer to arrange the boiler B, the water-tank O, and the steering mechanism as shown in the drawings, for the reasons that by this arrangement the principal part of the weight of the machine rests upon the drive-wheels, and one person can both steer the locomotive and do his own firing; but I do not limit myself to this arrangement, nor to the details of construction herein shown and described. The boiler may be placed in front of the axle $g'$, and the necessary changes made in the steering mechanism and in the position of the water-tank O.

Having thus described my invention, what I claim, and desire to secure by Letters Patent, is—

1. In a road-locomotive, the combination of the hand-wheel K, the horizontal shaft $k$, working in bearings $k'$ and $k^3$, the bevel-wheels $m$ and M, and the vertical shaft $m'$, working in bearings $k^3$ and $m^2$, and provided at its lower end with a chain-wheel, N, substantially as herein set forth, for the purpose specified.

2. In a road-locomotive, the combination, with an engine crank-shaft, $c$, of a pulley, $c'$, a belt, $c^2$, pulleys $c^4$ and D' D', placed on a shaft, D, working in bearings $d\ d$, the belts $d^2\ d^2$, the tight pulleys E E, and the loose pulleys E' E', placed on the shafts $e\ e$, all constructed and operating substantially as herein set forth, for the purpose specified.

3. In a road-locomotive, in combination, the pulley $c'$, placed rigidly on the crank-shaft $c$, the belt $c^2$, the pulleys $c^4$ and D' D', rigidly secured on the shaft D, the belts $d^2\ d^2$, the pulleys E E, the shafts $e\ e$, the sprocket-wheels F F, the chains $f\ f$, and the sprocket-wheels G G, substantially as herein set forth.

4. In a road-locomotive, in combination with the rectangular supporting-frame A, the shafts $k$ and $m'$, the bevel-wheels $m$ and M, the chain-wheel N, the fifth-wheel N', the frame $n$, and the springs $n^2$, substantially as shown and described.

FRANKLIN D. PIERCE.

Witnesses:
G. W. GIBBS,
GEO. KARBACH.